Dec. 7, 1926.

E. G. WATROUS 1,609,337

SUPPLY VALVE

Filed Feb. 13, 1924

Inventor:
Earl G. Watrous,
By Glenn S. Noble
Atty.

Patented Dec. 7, 1926.

1,609,337

UNITED STATES PATENT OFFICE.

EARL G. WATROUS, OF CHICAGO, ILLINOIS.

SUPPLY VALVE.

Application filed February 13, 1924. Serial No. 692,470.

This invention relates to supply valves which are particularly adapted for use in connection with water tanks for toilets and which are frequently designated as ball cocks. These valves are operated by means of floats and serve to permit the automatic filling of the tanks after they have been emptied and are closed automatically by the floats when the water in the tanks reaches a predetermined level. While such cocks or valves have been in more or less common use, they have been found objectionable on account of the noise made by the water flowing into the tank through the valve which is particularly noticeable if the water is under high pressure. In such cases the ordinary valve is apt to whistle or make various strange noises which are especially objectionable in connection with high grade plumbing such as adapted for use in homes, hotels, apartment buildings and the like. Another objectionable feature in such valves as commonly constructed is the relatively large number of parts used in connecting the floats to the valves and providing adjustment between these parts for different levels of water in the tanks.

Among the objects of this invention are to provide a supply valve of this character which will avoid such objectionable features as far as possible; to provide an automatic water control mechanism which will be comparatively quiet or noiseless as well as being positive in action; to provide an improved form of supply valve of the character indicated; to provide a valve with a float control having a minimum number of connecting parts; to provide a supply valve or ball cock with a simple and efficient connecting and adjusting mechanism; and, in general, to provide such desirable features of construction as will appear from the following description.

In the accompanying drawings illustrating this invention,

Figure 1:
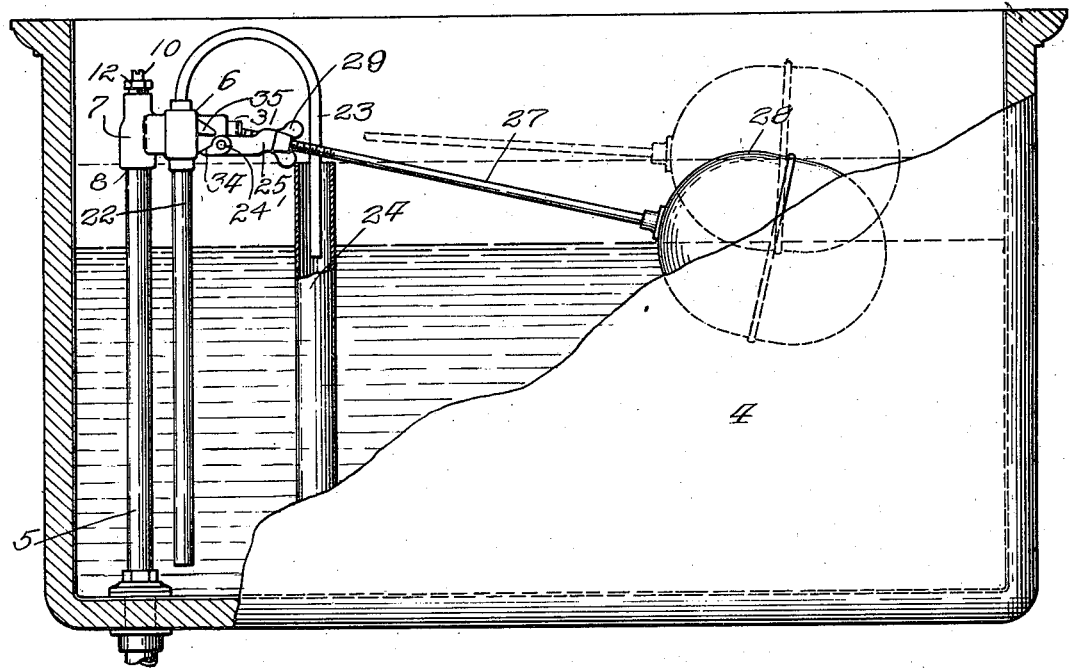
Figure 1 is a side view of a water tank with parts broken away to show the supply valve; such valve and connected parts being also shown in adjusted position, in dotted lines.
Figure 2:
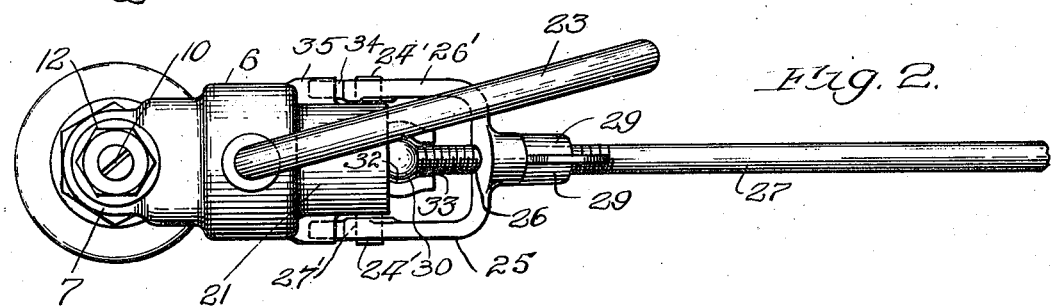
Figure 2 is an enlarged plan view of the valve.

The water tank 4 is provided with the usual intake or inlet pipe 5 which has a water controlling and shut off device 6 at the top thereof, such device being designated as a whole as the supply valve. This supply valve comprises a casing or body portion 7 having an inlet opening 8 which is tapped to receive the inlet pipe 5. A water controlling valve 9 is arranged in alignment with the inlet pipe 5 and is adapted to coact therewith. The stem 10 of this valve is threaded to engage with the threaded hole 11 in the casing and is provided with a gland or packing nut 12 to prevent leakage. The valve 9 is preferably made with a cylindrical portion so that it will project into the inlet pipe 5 in order to check the force of the water and lessen the noise caused thereby and is provided with a conical portion which coacts with the end of the pipe to further lessen the noise and also to serve as a shut-off. The body or casing 7 has a first chamber 13 to which the water passes from the pipe 5 and a second chamber 14 into which the water passes from the chamber 13. The passageway 15 between these chambers is threaded to receive a replaceable nipple 16 which acts as a valve seat for the stop valve 17. This valve comprises a substantially tubular portion which fits over the nipple 16 so that the water may pass between the same. It also comprises a disk or washer 18 which is preferably made of leather, rubber or other suitable material in order to make a tight closure against the end of the nipple 16 and to assist in reducing the noise caused by the flow of the water through the valve. The tubular or cylindrical portion of the valve 17 is threaded to receive a cylindrical guide and connecting member 19 and a flanged packing ring 20 is arranged between the valve and connecting member. These parts fit in a cylindrical projection or bearing 21 which extends outwardly from the chamber 14, such parts taken together serving as a piston and preventing leakage through the projection. The water passes from the chamber 14 downwardly through the hush tube or outlet pipe 22 and may also pass upwardly through a refill tube 23 which leads to the usual overflow tube 24.

Figure 3:
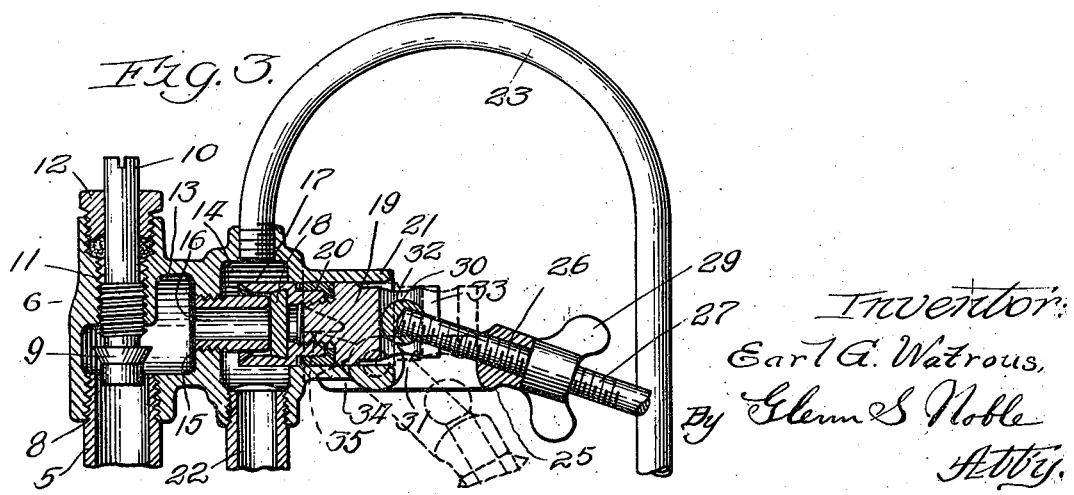
Figure 3 is a vertical sectional view of the same.

The sides of the body or casing 7 are provided with trunnions 24' which are preferably formed integrally therewith. These trunnions serve as a bearing for a yoke 25 which has arms 26' with holes 27' for engagement with the trunnions 24'. These arms are preferably made so that they will spread over the trunnions and when assembled are bent inwardly in order to bring them into engagement with such trunnions. The outer portion of the yoke is tapped or threaded at 26 to receive the correspondingly threaded float rod 27 which carries the float 28 at its outer or free end. A lock nut 29 serves to hold the rod in adjusted position in the yoke. The inner end of the rod 27 carries a ball or projection 30 which engages with a somewhat peculiarly shaped bearing 31 at the outer end of the piston guide member 19. This bearing has a vertical hole 32 for receiving the ball 30 and is provided with a slot 33 to permit the passage of the rod 27. The inner ends of the yoke 25 are preferably provided with projections 34 which are adapted to engage with stop lugs 35 on the side of the casing 7 in order to limit the downward movement of the float. The operation of the device will be readily understood from Figure 3 but it will be noted that when the float 28 moves downwardly due to the lowering of the water in the tank, the yoke 25 swings down and the ball or bearing member 30 swings outwardly or away from the valve body and consequently opens the valve to permit water to pass from the nipple 16 into the chamber 14 from whence it escapes through the outlet pipes. When the float swings down a predetermined distance, the projection 34 will engage with the lug 35 to stop the further movement of the parts, and at such time the valve will be opened a sufficient distance to permit the free passage of the water. The force of the water passing through the stop valve may be regulated by the controlling valve 9 by adjusting it toward or away from its seat in the end of the pipe 5. When the water again rises in the tank, it raises the float 28 and the yoke will be swung upwardly and the ball 30 will press the piston valve inwardly until the disc 18 closes against the nipple 16 and stops the flow of water.

It will be seen from this description and an inspection of the drawings, that the parts are not only comparatively few in number and simple in construction but may be readily assembled to make the completed structure. Furthermore, the float 28 may be readily adjusted with respect to the yoke to regulate the limit of the upward movement of the float and the closing action of the valve by merely turning the rod 27 and again adjusting the lock nut 29. This adjustment is desirable not only to provide for variations in the construction of the valve and connected parts but also for regulating the height of the water in the tank. For instance, if it is desired to raise the level of the water as shown in dotted lines in Figure 1, the float rod is screwed out from the yoke so as to lessen the length of the rod between the end of the yoke and the valve which permits the float to move upwardly in the position shown in the dotted lines of this figure. It will also be noted that the float and its rod may be readily disconnected from the valve by screwing the rod out from the yoke as shown in dotted lines in Figure 3 until the ball at the end of the rod reaches a point adjacent to the cross bar of the yoke at which time the float and rod may be swung downwardly until the ball passes below the piston member 19 and then this member and connected parts forming the valve may be drawn out of the cylindrical projection 21. When the parts are to be assembled, this operation may be reversed.

While my improved supply valve is particularly adapted for use in connection with toilet tanks, it may of course be used for other purposes, if desired, and may be changed in order to adapt it for different purposes or conditions and therefore I do not wish to be limited to the precise arrangement herein shown and described, except as specified in the following claims, in which I claim:

1. In a device of the character set forth, the combination of an inlet pipe, a valve body connected with said pipe, a fluid controlling valve coacting with the pipe, an outlet from the valve body, a stop valve for controlling the passage of the fluid through the outlet, a yoke pivoted to the valve body, a rod adjustably engaging said yoke and directly connected with the stop valve and a float secured to the rod.

2. In a device of the character set forth, the combination of a valve body having two chambers therein, an inlet for the first chamber, a valve for controlling said inlet, a passageway from the first chamber to the second chamber, a valve for controlling said passageway, an outlet from the second chamber, a link pivoted to the body, a rod adjustably secured to the link, means for operatively connecting the rod with the last named valve and a float carried by said rod.

3. In a supply valve, the combination of a casing having an inlet and having a cylindrical projection in axial alignment with the inlet, a piston valve slidably mounted in said projection and adapted to coact with the inlet for opening and closing the same, a yoke pivoted to the casing, a rod adjustably engaging with said yoke, a ball on the inner end of the rod engaging in a vertical opening in the piston valve and a float secured to said rod.

4. In a valve construction, the combination of a casing having an inlet on one side thereof, a nipple projecting inwardly from the inlet, a cylindrical bearing, a piston mounted in said bearing, a disk carried by said piston and adapted to engage with the nipple to close the inlet, said piston projecting beyond the bearing and having a bearing provided with a vertical opening and a slot on the end thereof communicating with said opening, a yoke pivoted to said casing, a rod engaging with a threaded hole in the yoke and passing through said slot, a ball on the inner end of the rod fitting in said opening, a lock nut for said rod and a float carried on the rod.

5. The combination with a valve having a reciprocating valve member, of a link pivoted to the valve body, a rod engaging with the link, means for adjusting the rod longitudinally with respect to the link for regulating the limit of movement of the float when closing the valve, means for operatively connecting one end of the rod directly with the valve member and a float secured to the opposite end of the rod.

6. In a device of the character set forth, the combination of a chamber having an inlet, a movable closure member cooperating with the inlet for opening and closing the same, a swinging member pivoted adjacent to the movable closure member, a rod adjustably secured to the swinging member and having its inner end adapted to coact with the movable closure member and a float for said rod.

7. The combination with a valve having a reciprocable member, of a swinging member pivoted to the valve body, a rod having a threaded engagement with said swinging member whereby the rod may be adjusted longitudinally with respect to the swinging member, a ball and socket joint between the rod and reciprocating member and a float carried by said rod.

8. The combination with a valve having a movable closure member, of a yoke pivoted to the valve body, a rod adjustably secured in said yoke whereby the rod may be adjusted longitudinally, a universal joint connection between the rod and the closure member and a float carried by said rod.

9. A supply valve comprising a casing having an inlet chamber and an outlet chamber, an inlet pipe connected with the inlet chamber, a regulating valve in alignment with said pipe and coacting therewith, a passageway between said chambers, a nipple secured in said passageway, a valve comprising a cylindrical portion extending over said nipple and a washer of resilient material in said cylindrical portion for engagement with the nipple, a connecting member secured to the valve, a packing ring between said valve and connecting member, a cylindrical projection in axial alignment with said nipple and carrying said valve and connecting member, a yoke pivoted to the valve body, a stop for said yoke, a rod having a threaded engagement with the yoke, a ball on the inner end of the rod engaging in a vertical opening in the connecting member and a float secured to said rod.

10. A supply valve having inlet and discharge ports, a plunger arranged to close the inlet port, a float, a stem connected with said float, a ball on the opposite end of the stem, link means for pivotally and adjustably mounting the stem on the valve body with the ball in engagement with the plunger to cause the plunger to move back and forth in accordance with the movement of the float.

EARL G. WATROUS.